United States Patent
Bostick et al.

(10) Patent No.: US 9,696,171 B2
(45) Date of Patent: Jul. 4, 2017

(54) DISPLAYING SUGGESTED STOPS ON A MAP BASED ON CONTEXT-BASED ANALYSIS OF PURPOSE OF THE JOURNEY

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/865,122

(22) Filed: Sep. 25, 2015

(65) Prior Publication Data

US 2017/0089718 A1    Mar. 30, 2017

(51) Int. Cl.
*G01C 21/36* (2006.01)
*G01C 21/34* (2006.01)

(52) U.S. Cl.
CPC ..... *G01C 21/3617* (2013.01); *G01C 21/3484* (2013.01); *G01C 21/3641* (2013.01); *G01C 21/3679* (2013.01); *G01C 21/3682* (2013.01); *G01C 21/3697* (2013.01); *G01C 21/362* (2013.01); *G01C 21/3667* (2013.01)

(58) Field of Classification Search
CPC ............ G01C 21/3617; G01C 21/3641; G01C 21/3484; G01C 21/3697; G01C 21/3682; G01C 21/3679; G01C 21/3667; G01C 21/362
See application file for complete search history.

(56) References Cited

U.S. PATENT DOCUMENTS

| | | | |
|---|---|---|---|
| 6,430,500 B1 * | 8/2002 | Kubota | G01C 21/3617 701/425 |
| 8,108,778 B2 | 1/2012 | Athsani et al. | |
| 8,855,919 B2 | 10/2014 | Tang | |
| 8,938,358 B1 * | 1/2015 | Shynar | G01C 21/3617 701/533 |
| 8,983,973 B2 | 3/2015 | Hill et al. | |
| 2008/0228394 A1 * | 9/2008 | Fukuda | G01C 21/26 701/532 |
| 2010/0070165 A1 | 3/2010 | Kang | |
| 2010/0205060 A1 * | 8/2010 | Athsani | G01C 21/3617 701/532 |
| 2010/0248746 A1 | 9/2010 | Saavedra et al. | |
| 2011/0082752 A1 * | 4/2011 | Dube | G01C 21/3484 701/533 |

(Continued)

OTHER PUBLICATIONS

Mapquest, "Locations Along Your Route", printed Aug. 9, 2015.

*Primary Examiner* — Dale W Hilgendorf
(74) *Attorney, Agent, or Firm* — Martin & Associates, LLC; Derek P. Martin

(57) ABSTRACT

A map application includes a mechanism to perform context-based analysis to determine the purpose of a journey. The context-based analysis can include an analysis of any or all of the following: the destination, one or more calendars, social media, and historical data. Once the context-based analysis determines the purpose of the journey, the map application suggests one or more stops based on the purpose of the journey, and displays the suggested stop(s) on the map displayed to the user.

17 Claims, 9 Drawing Sheets

1100

| User's Calendar | | |
|---|---|---|
| Friday August 28 | Saturday August 29 | Sunday August 30 |
| 7:00-9:00 PM Dinner with Peter Johnson | 9:00-11:00 AM Tennis Match at Fair Acres | 9:00-11:00 AM Tennis Match at Valley View |

1300

| Valley View Tennis Club Page |
|---|
| Calendar of Events |
| August 30 – Valley Open Tennis Tournament |

(56) References Cited

U.S. PATENT DOCUMENTS

| | | | |
|---|---|---|---|
| 2011/0191017 A1* | 8/2011 | Certin | G01C 21/3484 |
| | | | 701/532 |
| 2011/0313657 A1 | 12/2011 | Myllymaki et al. | |
| 2013/0035853 A1 | 2/2013 | Stout et al. | |
| 2013/0332113 A1 | 12/2013 | Piemonte et al. | |
| 2014/0039792 A1* | 2/2014 | Seetharam | G01C 21/3679 |
| | | | 701/538 |
| 2014/0279261 A1 | 9/2014 | Kolluri et al. | |
| 2014/0297415 A1 | 10/2014 | Chu et al. | |
| 2015/0168150 A1* | 6/2015 | Kahn | G01C 21/00 |
| | | | 701/538 |

* cited by examiner

1100

| User's Calendar |||
|---|---|---|
| Friday August 28 | Saturday August 29 | Sunday August 30 |
| 7:00-9:00 PM<br>Dinner with Peter Johnson | 9:00-11:00 AM<br>Tennis Match at Fair Acres | 9:00-11:00 AM<br>Tennis Match at Valley View |

| User's Historical Data ||||
|---|---|---|---|
| Saturday August 22 | Home to Fair Acres | Departed 8:21 AM | Stopped at 7-11 |
| Saturday August 15 | Home to Fair Acres | Departed 8:15 AM | Stopped at 7-11 |
| Saturday August 8 | Home to Fair Acres | Departed 8:24 AM | Stopped at 7-11 |
| Saturday August 1 | Home to Fair Acres | Departed 8:26 AM | Stopped at 7-11 |

| Valley View Tennis Club Page |
|---|
| Calendar of Events |
| August 30 – Valley Open Tennis Tournament |

| Suggested Stop |
|---|
| Quick Stop Convenience Store |

FIG. 13          FIG. 14

DISPLAYING SUGGESTED STOPS ON A MAP BASED ON CONTEXT-BASED ANALYSIS OF PURPOSE OF THE JOURNEY

BACKGROUND

1. Technical Field

This disclosure generally relates to map applications, and more specifically relates to displaying suggested stops on a map based on context-based analysis of the purpose of the journey.

2. Background Art

Map applications are well-known in the art, and include stand-along global positioning system (GPS) devices, such as those manufactured by GARMIN, and additionally include applications that run on a number of mobile devices including smart phones, tablets, laptop computers, etc. Known map applications typically determine the current location using GPS or other location services, allow a user to specify a destination, then select a route from the current location to the destination using a number of different criteria, including distance, estimated travel time, traffic problems, etc.

Some map applications allow a user to specify an interest, which results in the map application displaying items along the route that match the interest specified by the user. For example, if the user is making a long driving trip across the country, the user might specify an interest in gas stations. The mapping application could then display gas stations along the route to the destination.

SUMMARY

A map application includes a mechanism to perform context-based analysis to determine the purpose of a journey. The context-based analysis can include an analysis of any or all of the following: the destination, one or more calendars, social media, and historical data. Once the context-based analysis determines the purpose of the journey, the map application suggests one or more stops based on the purpose of the journey, and displays the suggested stop(s) on the map displayed to the user.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

FIG. 11 is part of a sample calendar for a user;

FIG. 12 is part of a user's historical data for past trips;

FIG. 13 shows a calendar on a destination's page; and

FIG. 14 shows a suggested stop based on the context-based analysis of the data in FIGS. 11-13.

DETAILED DESCRIPTION

Figure 1:
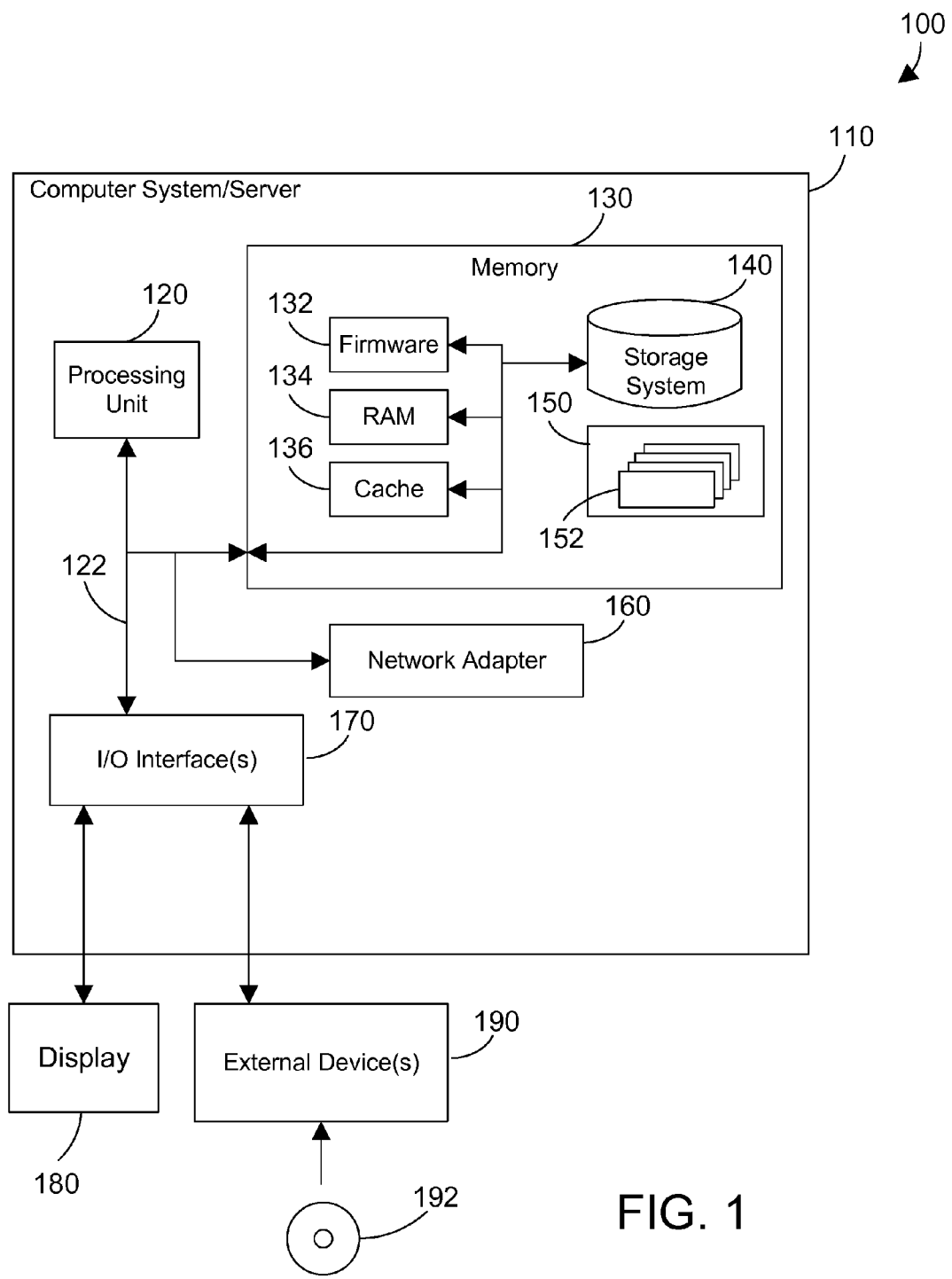
FIG. 1 is a block diagram of a cloud computing node.

The disclosure and claims herein relate to a map application that includes a mechanism to perform context-based analysis to determine the purpose of a journey. The context-based analysis can include an analysis of any or all of the following: the destination, one or more calendars, social media, and historical data. Once the context-based analysis determines the purpose of the journey, the map application suggests one or more stops based on the purpose of the journey, and displays the suggested stop(s) on the map displayed to the user.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of firmware 132, random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
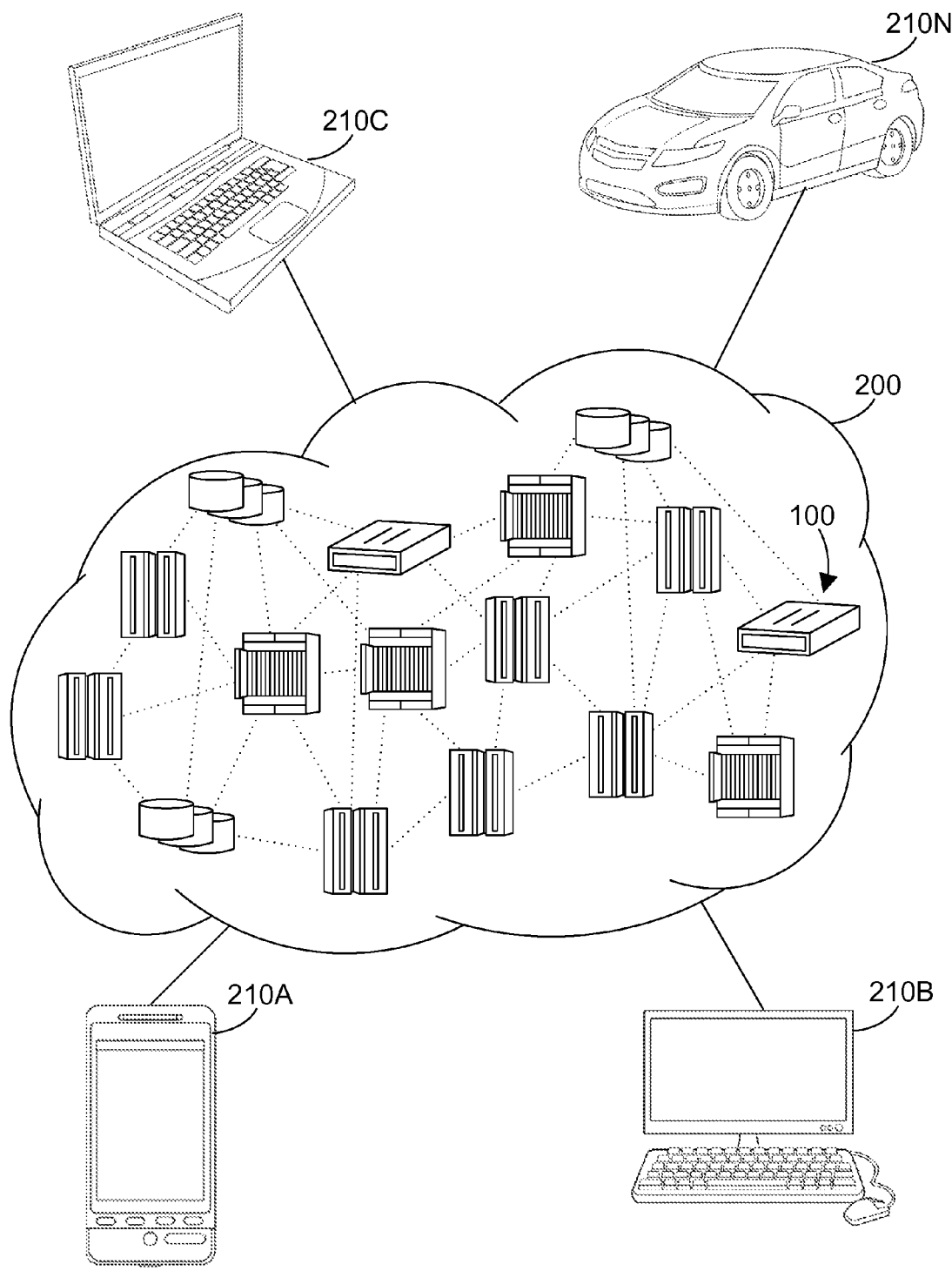
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
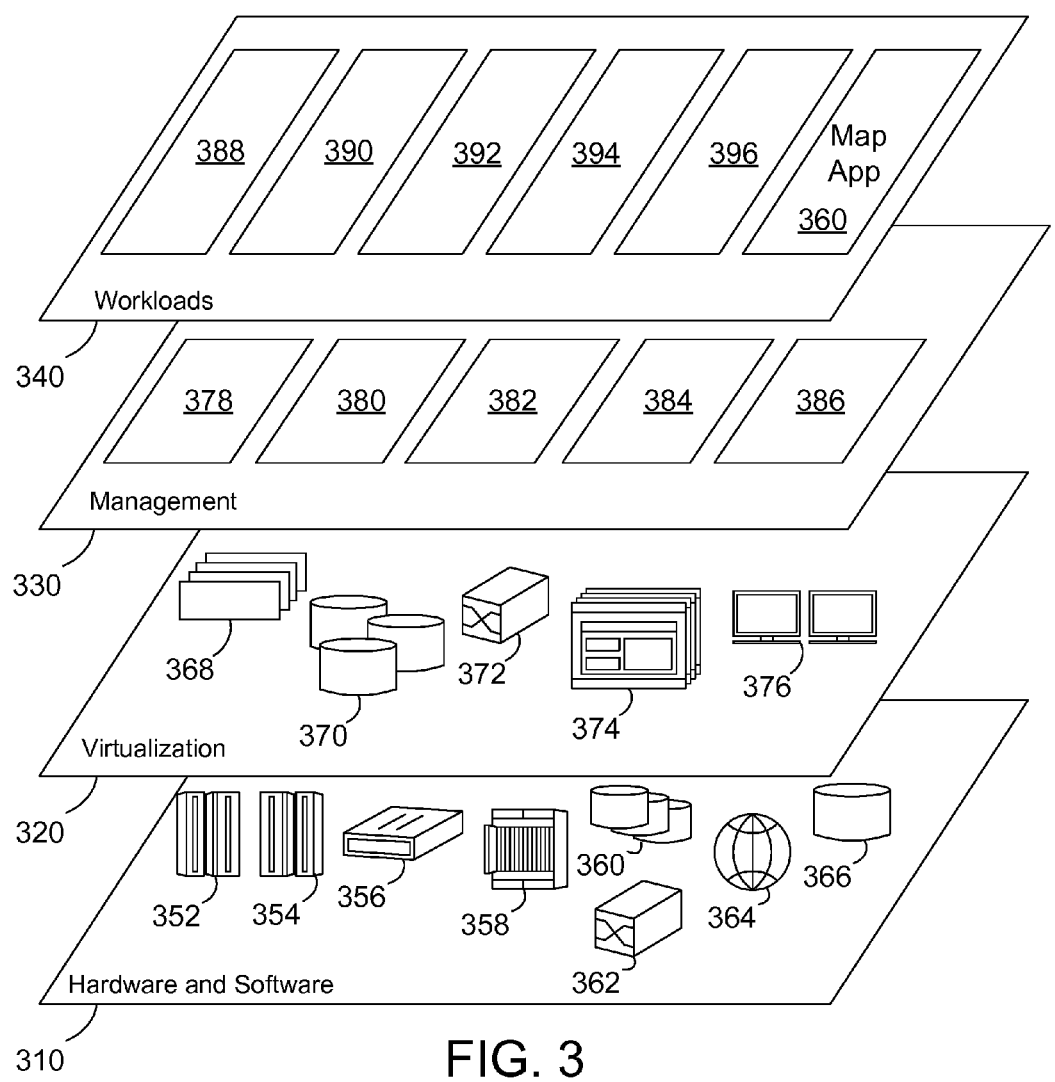
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA.

Workloads layer 340 provides examples of functionality for which the cloud computing environment may be utilized. Examples of workloads and functions which may be provided from this layer include: mapping and navigation 388; software development and lifecycle management 390; virtual classroom education delivery 392; data analytics processing 394; transaction processing 396 and map application 360. The map application 360 is described in more detail below.

Figure 4:
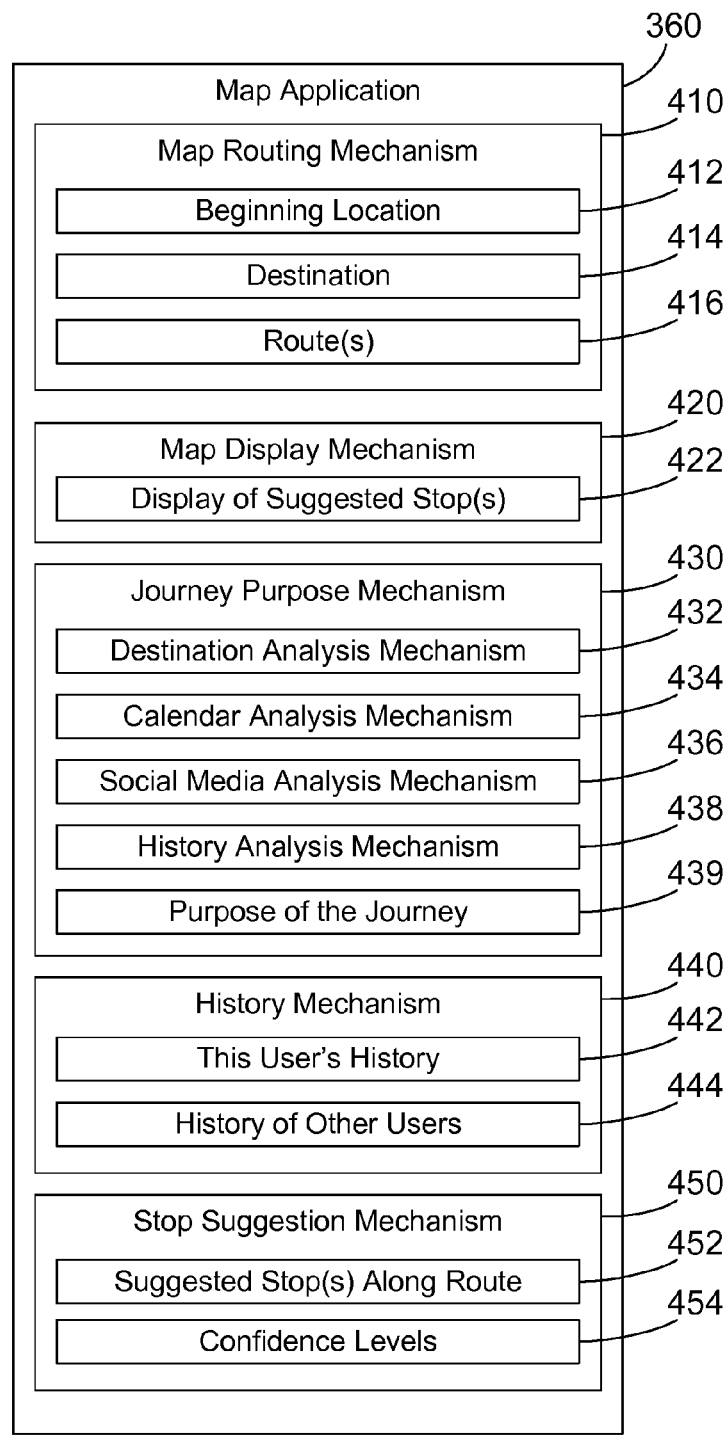
FIG. 4 is a block diagram showing some features of a map application.

FIG. 4 is a block diagram that shows some of the features of the map application 360 shown in FIG. 3. Map application 360 preferably includes a map routing mechanism 410, a map display mechanism 420, a journey purpose mechanism 430, a history mechanism 440, and a stop suggestion mechanism 450. The map routing mechanism 410 determines a beginning location 412 and a destination 414. The beginning location 412 could be specified by the user, or could be detected using any suitable technology, such as using global positioning system (GPS) coordinates. The destination 414 is preferably specified by the user. Using the beginning location 412 and the destination 414, the map routing mechanism determines one or more routes 416 to get from the beginning location 412 to the destination 414 using any suitable criteria, which could include distance, estimated travel time, traffic problems, etc. The map routing mechanism 410 could include the functions of known map applications for determining one or more routes based on the beginning location 412 and the destination 414.

The map display mechanism 420 displays a map to the user, which typically includes the beginning location 412, the destination 414, and one of more of the routes 416. Note that map display mechanism 420 could display any suitable portion to the user depending on the size of the display, the distance being traveled, and the scale being displayed. For example, at the beginning of the journey, the map display mechanism 420 might display the beginning location 412 and the first part of the route 416 without displaying the destination 414. As the journey proceeds, the beginning location 412 might not be displayed, with only a portion of the route being displayed. Once the journey proceeds to a point sufficiently close to the destination 414, the map display mechanism 420 could display the end portion of the route 416 along with the destination 414. The functions of displaying a beginning location 412, a route 416, and a destination 414 are well-known in the art, and need not be discussed in more detail herein. The map application 360 adds information to the displayed map by adding a display of one or more suggested stops 422. The display of suggested stop(s) 422 is based on the suggested stop(s) along the route 452. The suggested stop(s) along the route 452 are determined by the journey purpose mechanism 430 and stop suggestion mechanism 450 as discussed in more detail below.

The journey purpose mechanism 430 provides context-based analysis to determine a purpose of the journey 439. The context analyzed by the journey purpose mechanism 430 can include context related to the destination, context relating to one or more calendars, context relating to social media, and context relating to history of past trips. The destination analysis mechanism 432 preferably analyzes context information related to the destination. Such context information can include, for example, any information regarding the destination, which could be based on the address of the destination. For example, a destination could be put into a category of residential or business destinations. Residential destinations could be further divided into sub-categories such as single-family homes, apartments, condominiums, duplexes, or any other type of residential housing. Business addresses could be further divided into sub-categories such as restaurants, sports venues, gas stations, shops, offices, or any other suitable business type. The destination analysis mechanism 432 can consult any available database to determine context information for the destination. For example, an online database could correlate an address to corresponding residential or business types, such as those listed above.

The calendar analysis mechanism 434 preferably analyzes context information derived from one or more calendars. For example, the calendar analysis mechanism 434 could analyze a calendar of the user that is using the map application 360. The user's calendar could be accessed on a portable device running the map application 360, or could be accessed from an online calendar for the user. Information in the user's calendar might give an idea regarding the purpose of the journey 439. For example, if the user's calendar has a dinner appointment at a specified time, the purpose of the user's journey just before the specified time could be to travel to the dinner appointment. In addition to the user's calendar, the calendar analysis mechanism 434 can also analyze other calendars, such as a calendar corresponding to the destination. Thus, if a tennis club has a calendar posted that shows a tennis tournament on a Sunday morning, the purpose of a Sunday morning journey to the tennis club could be to play in the tennis tournament or to watch the tennis tournament. The calendar analysis mechanism 434 determines whether any information in a calendar can help in giving context to help determine the purpose of the journey 439.

The social media analysis mechanism 436 preferably analyzes context information derived from social media. For example, the social media analysis mechanism 436 could analyze social media related to the user that is using the map application 360. Note the term "social media" can include any information that is publicly available online, including without limitation FACEBOOK, TWITTER, INSTAGRAM, PINTEREST, and any other web site or online service. Social media related to the user could include content authored by the user or content authored by others about the user. The social media analysis mechanism 436 could also analyze context information from social media related to the destination, or social media corresponding to a person, place or event found in the user's calendar or in a calendar corresponding to the destination. Accessing social media provides context information that helps the journey purpose mechanism 430 determine the purpose of the journey 439.

The history analysis mechanism 438 preferably analyzes context information derived from logged historical information, such as the user's history 442 and the history of other users 444 logged by a history mechanism 440. The user's history 442 could include any suitable historical information relating to past journeys, including dates, beginning locations and destinations, time traveled, stops made, and any other suitable historical information. The history of other users 444 could include any suitable historical information relating to past journeys made by other users, including dates, beginning locations and destinations, time traveled, stops made, and any other suitable historical information. The history of other users 444 could be especially valuable for providing context information for a journey the user has never made before.

The stop suggestion mechanism 450 uses the purpose of the journey 439 as determined by the journey purpose mechanism 430, to determine one or more suggested stops along the route 452. The suggested stops along the route 452 can have corresponding confidence levels 454. The confidence levels 454 can be adjusted up or down based on the user's behavior during a journey. For example, if the stop suggestion mechanism 450 suggests two stops based on the determined purpose of the journey 439, and the user makes one of the two stops, the confidence level corresponding to the stop the user made could be increased and the confidence level corresponding to the stop the user did not make could be decreased. This continual adjustment of confidence levels 454 allows the map application 360 to dynamically adapt and learn so it can more accurately predict the purpose of the journey 439.

Figure 5:
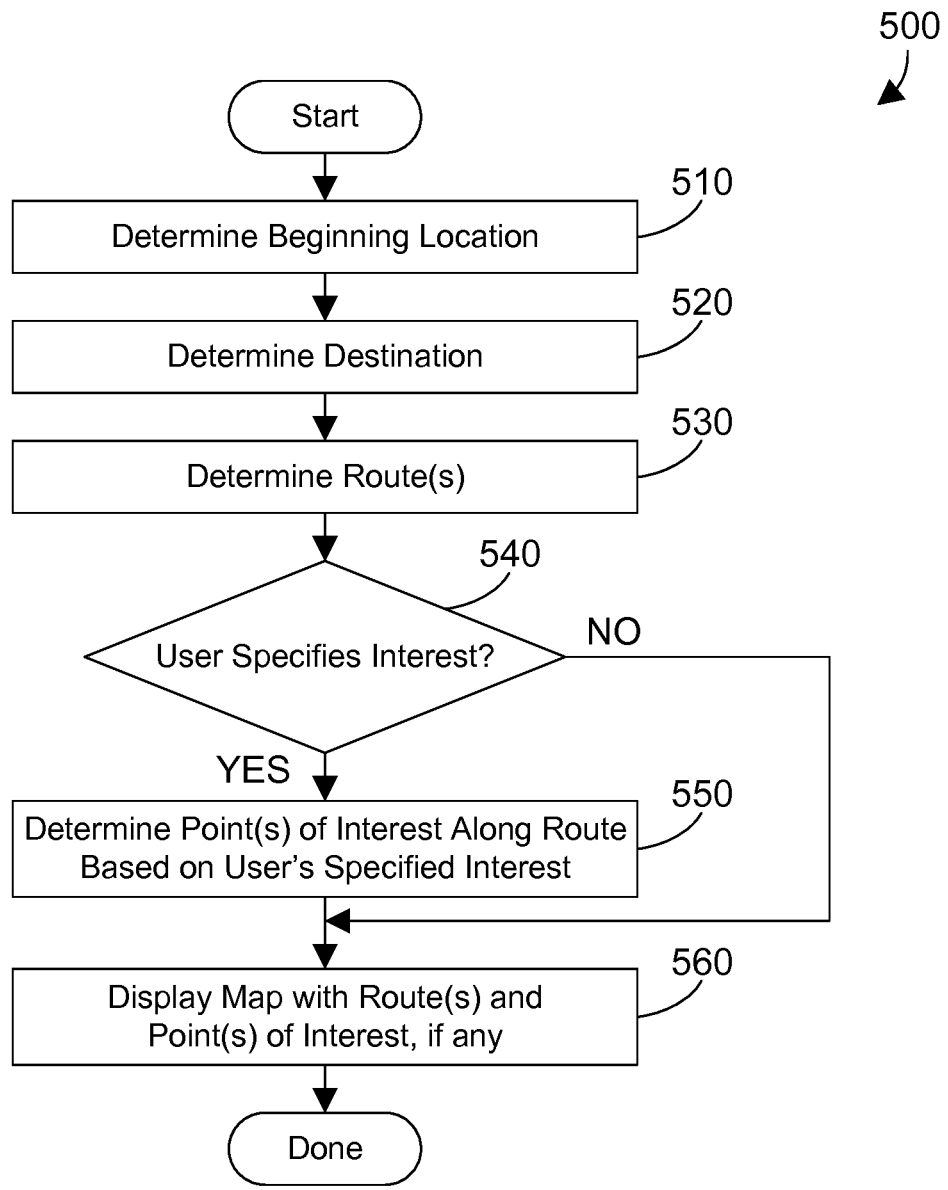
FIG. 5 is block diagram of a prior art method for a prior art map application to display a map with a route.

Referring to FIG. 5, a prior art method 500 for known map applications is shown. A beginning location is determined (step 510). A destination is determined (step 520). One or more routes are determined (step 530). When a user specifies an interest (step 540=YES), determine points of interest along the route based on the user's specified interest (step 550). Then display the map with one or more routes and the point(s) of interest, if any (step 560). When the user does not specify an interest (step 540=NO), the map is displayed with the routes, but when the user did not specify an interest in step 540 (step 540=NO), no points of interest are displayed in step 560. Method 500 is then done.

A simple example will illustrate prior art method 500 shown in FIG. 5. Let's assume a user is traveling from her home to a college football stadium, and wants to stop at a grocery store to stock up on tailgating food on the way to the stadium. The user could specify in step 540 "grocery store" or more particularly, a specific name of a grocery store chain. The location(s) of grocery stores that match the user's specified interest are then displayed on the map along the route. Note that in prior art method 500, for the points of interest to be displayed on the map in step 560, the user must specify an interest in step 540. Otherwise the map is displayed without the point(s) of interest.

The disclosure and claims herein improve on prior art method 500 by doing context-based analysis to determine a purpose of the journey, then suggesting one or more stops along the route based on the purpose of the journey, without the user having to specify any interest, as in the prior art.

Figure 6:
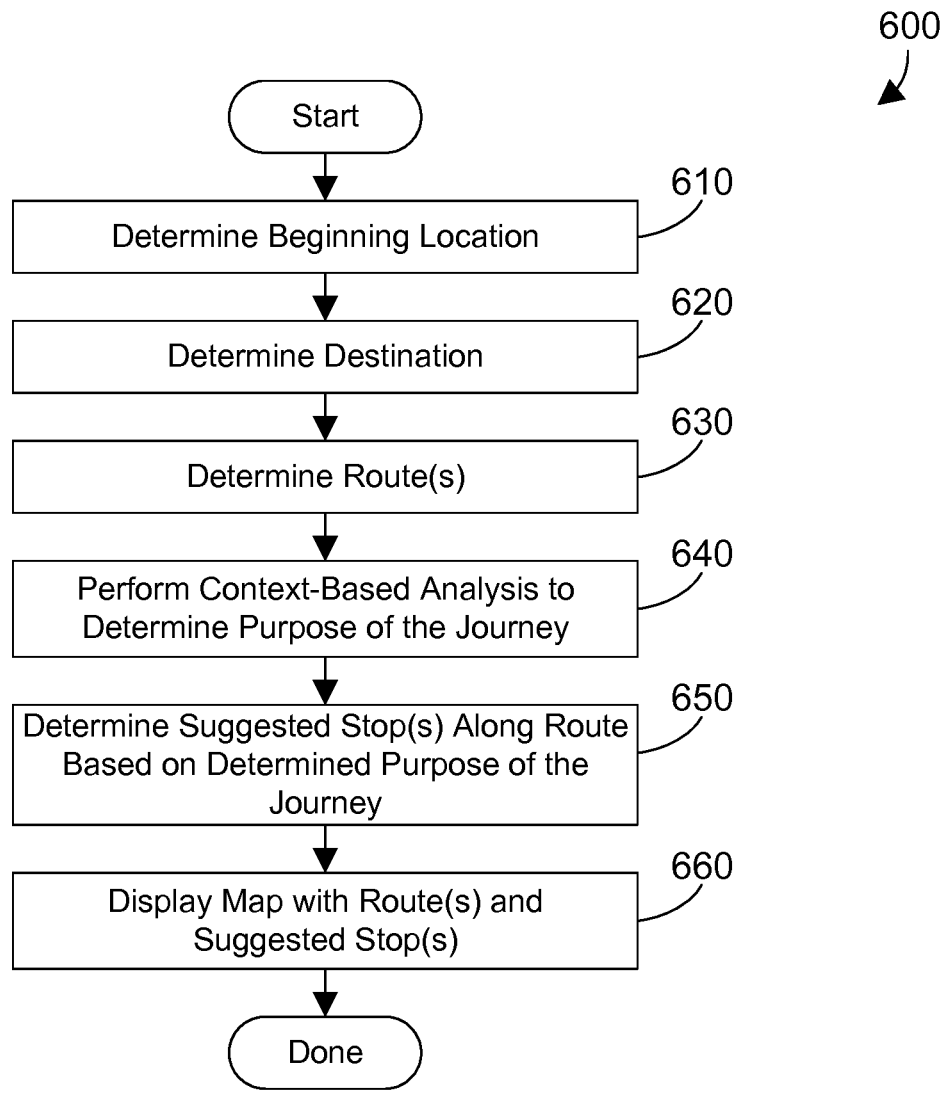
FIG. 6 is a flow diagram of a method for performing context-based analysis to determine the purpose of a journey, and displaying one or more suggested stops on a displayed map based on the purpose of the journey.

Referring to FIG. 6, method 600 begins by determining a beginning location 610, determining a destination 620, and determining one or more routes 630. In one specific implementation, steps 610, 620 and 630 could be corresponding prior art step 510, 520 and 530 shown in FIG. 5. In a different implementation, steps 610, 620 and 630 could include additional or different functions. Once one or more routes are determined in step 630, a context-based analysis is performed to determine the purpose of the journey (step 640). The context-based analysis can be based on any suitable information that can provide context for the journey. Examples of suitable information that can provide context for the journey includes a type of destination, calendar information, social media, and historical data. Once the purpose of the journey is determined in step 640, one or more suggested stops along the route are determined based on the purpose of the journey (step 650). The map is then displayed with the one or more routes and the suggested one or more stops (step 660). Method 600 is then done.

Figure 7:
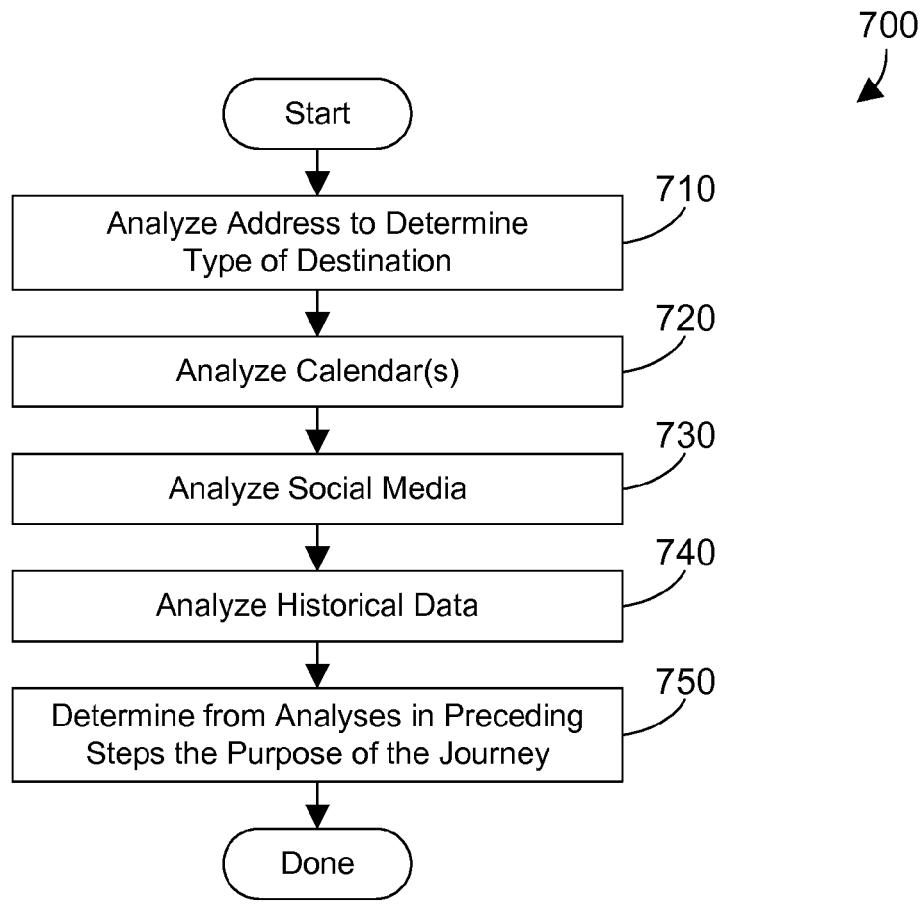
FIG. 7 is a flow diagram of one suitable method for a map application to perform context-based analysis to determine purpose of a journey.

Any suitable context-based analysis can be included in step 640 to determine the purpose of the journey. Referring to FIG. 7, a method 700 is one suitable implementation for step 640 in FIG. 6. The address of the destination is analyzed to determine a type of destination (step 710). Type can include residential, business, industrial, or any other suitable category. Type can further include sub-categories as listed above. One or more calendars that may include context information are analyzed (step 720). Social media sources that may include context information are analyzed (step 730). Historical data is analyzed (step 740). From the analyses in steps 710, 720, 730 and 740, the purpose of the journey is determined (step 750). Method 700 is then done. Note the analyses shown in FIG. 7 can all be performed, or some subset of these can be performed, depending on available data sources.

Figure 8:
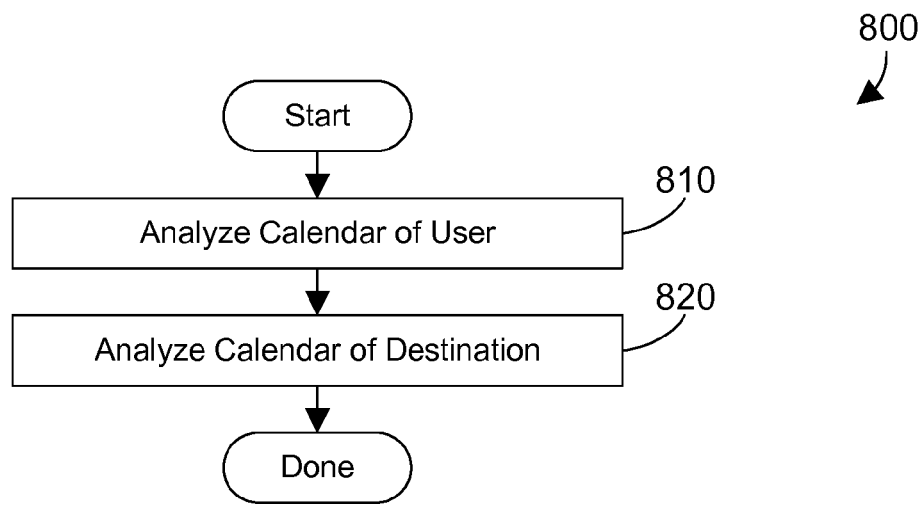
FIG. 8 is a flow diagram of a method for a map application to analyze one or more calendars.

Multiple calendars could be analyzed in step 720. Method 800 in FIG. 8 shows suitable steps that could be performed in step 720 in FIG. 7. The calendar of the user is analyzed (step 810). The calendar of the destination is analyzed (step 820). Method 800 is then done. Note the destination may not have a calendar, but if it does, the calendar of the destination can provide context information that helps determine the purpose of the journey. Note the calendar of the destination 820 could be available via a website for the destination, via social media relating to the destination, or via any other suitable online resource.

Figure 9:
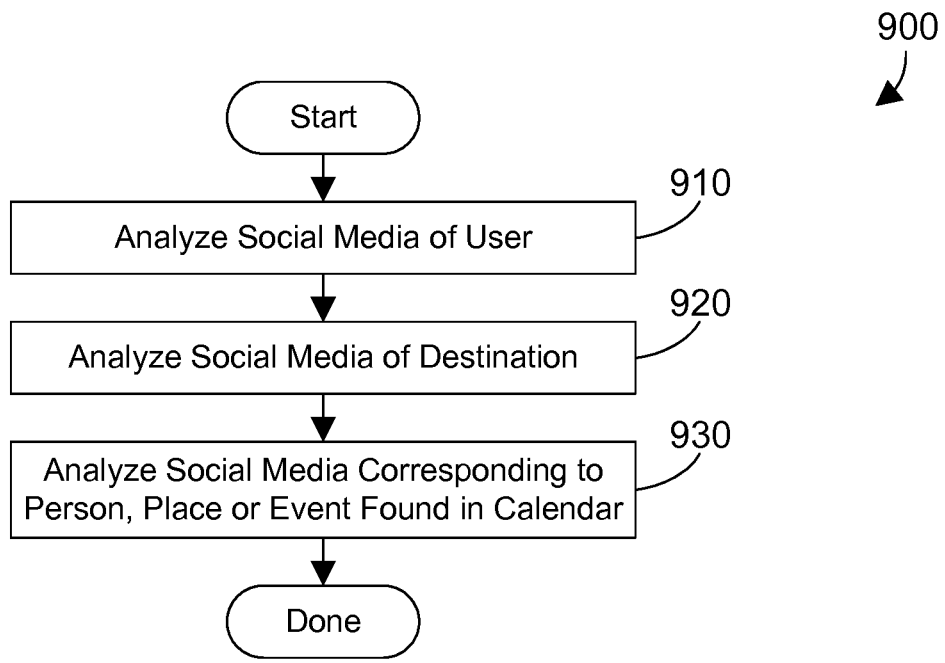
FIG. 9 is a flow diagram of a method for a map application to analyze social media.

The analysis of social media in step 730 in FIG. 7 could include different types of social media. Method 900 in FIG. 9 shows suitable steps that could be performed in step 730 in FIG. 7. The social media of the user is analyzed (step 910). The social media of the destination is analyzed (step 920). The social media corresponding to a person, place or event found in a calendar is analyzed (step 930). Method 900 is then done.

Figure 10:
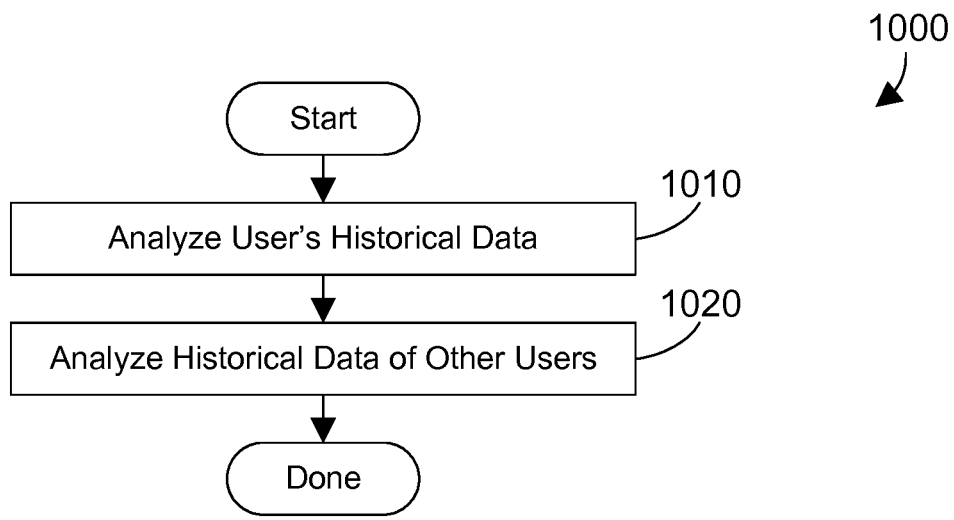
FIG. 10 is a flow diagram of a method for a map application to analyze historical data.

The analysis of historical data in step 740 in FIG. 7 could include different types of historical data. Method 1000 in FIG. 10 shows suitable steps that could be performed in step 740 in FIG. 7. The user's historical data is analyzed (step 1010). The historical data of other users is also analyzed (step 1020). Method 1000 is then done. The user's own historical data is very relevant to providing context that can help determine a purpose for the user's journey. But when the user is making a journey for the first time, the historical data of others could help to predict the purpose of the journey. For example, if the user is going to a college stadium for a football game, an analysis of historical data of other users who attend college football games could indicate that a relatively high percentage of users stop at a grocery store on the way to the game. Using this information, the suggested stops could include one or more grocery stores.

FIGS. 11-13 illustrate some specific examples of context information that can be used to determine the purpose of a journey. Referring to FIG. 11, a portion of a user's calendar 1100 includes three appointments, namely: dinner with Peter Johnson on Friday August 28 from 7:00-9:00 PM; a tennis match at Fair Acres on Saturday August 29 from 9:00-11:00 AM; and a tennis match at Valley View on Sunday August 30 from 9:00-11:00 AM. We assume for this example the user's historical data 1200 shown in FIG. 12 shows the user has traveled to the Fair Acres Tennis Club for the past four Saturday mornings before 9:00 AM, and always stops at a 7-11 convenience store to buy a drink on the way. We also assume for this example the Valley View Tennis Club has a page 1300 that includes a calendar of events that shows August 30 is the date for the Valley Open Tennis Tournament.

Now let's assume the user leaves her home at 6:15 PM on Friday August 28 to a destination address. The journey purpose mechanism 430 could analyze the user's calendar 1100 and determine the user has a dinner appointment with Peter Johnson at 7:00 PM. The journey purpose mechanism 430 could check an online database to make sure the address is a residence, and could even go one step further to determine whether the address is the residence of Peter Johnson. The journey purpose mechanism could conclude the purpose of the journey is to drive to Peter Johnson's house for a dinner appointment, and in response, could display to the user stores along the route that sell wine as suggested stops, in case the user wants to take a bottle of wine to the dinner appointment.

On Saturday morning, the user gets in her car and leaves her home at 8:20 AM to go to Fair Acres Tennis Club. The journey purpose mechanism 430 could analyze the user's calendar and determine the user has an appointment at 9:00 AM that morning for a tennis match at Fair Acres. In addition, the user's historical data 1200 shows the user has driven to the Fair Acres Tennis Club each Saturday morning about the same time for the past four weeks. The user's historical data further shows the user stopped at a 7-11 convenience store along the way to buy a drink. Based on the context information in the user's calendar 1100 and the user's historical data 1200, the journey purpose mechanism 430 could determine the purpose of the journey is to travel to Fair Acres Tennis Club for a tennis match, and suggest a stop at the same 7-11 in the user's historical data 1200.

On Sunday morning, the user gets in her car and leaves her home at 8:12 to go to the Valley View Tennis Club. We assume for this example this is the first time the user has ever driven to the Valley View Tennis Club. The journey purpose mechanism 430 could analyze the user's calendar and determine the user has an appointment at 9:00 AM that morning for a tennis match at Valley View. The journey purpose mechanism 430 could analyze the user's historical data 1200 and determine the user has not traveled to the Valley View Tennis Club before. The journey purpose mechanism 430 could analyze a page for the Valley View Tennis Club 1300 as shown in FIG. 13, which includes a calendar of events that indicates that August $30^{th}$ is the Valley Open Tennis Tournament. Even though the user has never driven to the Valley View Tennis Club before, the user's historical data 1200 combined with the user's calendar 1100 and the Valley View Tennis Club page 1300 clearly indicate the purpose of the journey is to travel to the Valley View Tennis Club for a tennis match. Based on the historical data 1200, the journey purpose mechanism 430 determines the user stops at a 7-11 convenience store on the way to Fair Acres Tennis Club, and can determine a suggested stop for the user at a 7-11 convenience store. But for this example, we assume there are no 7-11 convenience store along the route to the Valley View Tennis Club. The stop suggestion mechanism 450 can determine that absent a 7-11 convenience store, a stop at a different convenience store is a suggested stop. The stop suggestion mechanism 450 determines a Quick Stop convenience store is a suggested stop along the route as shown in FIG. 14, and displays the location of the quick stop convenience store as a suggested stop on the displayed map. This simple example shows that even though the user has never traveled to the Valley View Tennis Club before, based on the available context information, the map mechanism can display a suggested stop at the Quick Stop convenience store based on determining the user is traveling to Valley View for a tennis match, without the user taking any action to indicate an interest in tennis clubs or convenience stores.

While the examples above discuss determining suggested stops along the route and displaying suggested stops along the route, the term "along the route" can have a very loose connotation. In other words, a user might not mind going a few blocks out of the way to reach a suggested stop. While a stop a few blocks away is not right on the route, it is certainly "along the route", meaning in a broad sense it is not far off the route. Note the definition of what is "along the route" could be user-customizable. Thus, the user could very tightly define "along the route" to mean within a block of the route, or could very loosely define "along the route" to mean within two miles of the route.

In one specific implementation, the map mechanism 360 runs on a cloud computing node 100 as shown in FIG. 1 and described above. It is assumed the cloud computing node 100 has access to online data sources. In the alternative, the map mechanism 360 could run on any mobile device that has Internet access so online data sources can be queried in determining the purpose of the journey.

The disclosure and claims herein relate to a map application that includes a mechanism to perform context-based analysis to determine the purpose of a journey. The context-based analysis can include an analysis of any or all of the following: the destination, one or more calendars, social media, and historical data. Once the context-based analysis determines the purpose of the journey, the map application suggests one or more stops based on the purpose of the journey, and displays the suggested stop(s) on the map displayed to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a map application residing in the memory and executed by the at least one processor, the map application comprising:
  a map routing mechanism that determines a route between a beginning location and a destination;
  a journey purpose mechanism that determines a purpose for a journey from the beginning location to the destination by analyzing context information relating to the journey and that determines at least one suggested stop along the route before reaching the destination based on the determined purpose for the journey, wherein the context information comprises a calendar for a user of the map application and historical data regarding past trips by the user; and
  a display mechanism that displays the route and the at least one suggested stop along the route.

2. The apparatus of claim 1 wherein the context information further comprises a calendar corresponding to the destination.

3. The apparatus of claim 1 wherein the context information further comprises an address of the destination to determine a type for the destination.

4. The apparatus of claim 1 wherein the context information further comprises social media relating to the user.

5. The apparatus of claim 1 wherein the context information further comprises social media relating to the destination.

6. The apparatus of claim 1 wherein the context information further comprises:
a calendar corresponding to the destination;
an address of the destination to determine a type for the destination;
social media relating to the user;
social media relating to the destination;
social media relating to a person, place or event in the calendar for the user;
and
historical data regarding past trips by other users.

7. A computer-implemented method executed by at least one processor for displaying a map to a user, the method comprising:
determining a route between a beginning location and a destination;
determining a purpose for a journey from the beginning location to the destination by analyzing context information relating to the journey, wherein the context information comprises a calendar for the user and historical data regarding past trips by the user;
determining at least one suggested stop along the route before reaching the destination based on the determined purpose for the journey; and
displaying the route and the at least one suggested stop along the route.

8. The method of claim 7 wherein the context information further comprises a calendar corresponding to the destination.

9. The method of claim 7 wherein the context information further comprises an address of the destination to determine a type for the destination.

10. The method of claim 7 wherein the context information further comprises social media relating to the user.

11. The method of claim 7 wherein the context information further comprises social media relating to the destination.

12. The method of claim 7 wherein the context information further comprises:
a calendar corresponding to the destination;
an address of the destination to determine a type for the destination;
social media relating to the user;
social media relating to the destination;
social media relating to a person, place or event in the calendar for the user;
and
historical data regarding past trips by other users.

13. An article of manufacture comprising software stored on a non-transitory computer readable storage medium, the software comprising:
a map routing mechanism that determines a route between a beginning location and a destination;

a journey purpose mechanism that determines a purpose for a journey from the beginning location to the destination by analyzing context information relating to the journey and that determines at least one suggested stop along the route before reaching the destination based on the determined purpose for the journey, wherein the context information includes a calendar for a user of the map application and historical data regarding past trips by the user; and a display mechanism that displays the route and the at least one suggested stop along the route.

14. The article of manufacture of claim 13 wherein the context information further comprises a calendar corresponding to the destination.

15. The article of manufacture of claim 13 wherein the context information further comprises an address of the destination to determine a type for the destination.

16. The article of manufacture of claim 13 wherein the context information further comprises social media relating to the user and social media relating to the destination.

17. The article of manufacture of claim 13 wherein the context information further comprises:

a calendar corresponding to the destination;

an address of the destination to determine a type for the destination;

social media relating to the user;

social media relating to the destination;

social media relating to a person, place or event in the calendar for the user;

and historical data regarding past trips by other users.

* * * * *